United States Patent [19]

McNally

[11] 3,775,636
[45] Nov. 27, 1973

[54] DIRECT VIEW IMAGING TUBE INCORPORATING VELOCITY SELECTION AND A REVERSE BIASED DIODE SENSING LAYER

[75] Inventor: Frank X. McNally, Baltimore, Md.

[73] Assignee: Westinghouse Electric Corporation, Pittsburgh, Pa.

[22] Filed: June 21, 1971

[21] Appl. No.: 155,080

[52] U.S. Cl............. 315/10, 315/11, 315/21, 313/65 R
[51] Int. Cl............................................ H01j 31/26
[58] Field of Search............ 315/10 R, 10 X, 11 R, 315/11 X; 313/65, 66, 67

[56] References Cited
UNITED STATES PATENTS

| | | | |
|---|---|---|---|
| 3,560,756 | 2/1971 | Labuda | 313/66 |
| 3,435,234 | 3/1969 | Denton et al. | 313/66 X |
| 2,903,596 | 8/1959 | Reed | 313/67 X |
| 2,888,513 | 5/1959 | Melamed et al. | 313/67 X |
| 2,550,316 | 4/1951 | Wilder | 313/67 |
| 2,945,973 | 7/1960 | Anderson | 313/66 X |
| 2,898,499 | 8/1959 | Sternglass et al. | 313/67 X |
| 3,201,630 | 8/1965 | Orthuber et al. | 313/67 X |
| 3,423,623 | 1/1969 | Wendland | 315/10 |
| 3,646,390 | 2/1972 | Silver | 315/11 |
| 3,541,383 | 11/1970 | Pruett et al. | 315/10 |

Primary Examiner—Carl D. Quarforth
Assistant Examiner—P. A. Nelson
Attorney—F. H. Henson et al.

[57] ABSTRACT

A direct view imaging tube which incorporates a reversed biased diode array sensing structure for sensing input radiation to modulate a velocity selection type image section.

5 Claims, 2 Drawing Figures

PATENTED NOV 27 1973 3,775,636

DIRECT VIEW IMAGING TUBE INCORPORATING VELOCITY SELECTION AND A REVERSE BIASED DIODE SENSING LAYER

BACKGROUND OF THE INVENTION

This invention relates to a light sensitive direct view imaging device and more particularly to that utilizing a reverse biased diode type sensing structure associated with a velocity selection type tube.

Television camera tubes utilizing semiconductor diode array target sensing structures and then scanned by an electron beam for deriving a signal representative of input radiation directed onto the target are well known in the art. Such structures are generally discussed in U.S. Pat. No. 3,419,746 issued Dec. 31, 1968 to Crowell et al. Utilization of an electron beam for reading the silicon type diode array target is found to exhibit some problems. More particularly, the areas of the target between the p-n junctions may charge up in that an insulating coating is normally provided on this intervening area. Some of the arrangements proposed in the art to solve this problem result in lateral leakage at the surface which is difficult to reduce when utilizing the beam reading method. Elimination of the electron beam readout would obviously solve such a problem.

It is also obvious that the utilization of a pick-up tube in combination with a display or monitor device and associated circuitry is much more complicated than a simple direct view imaging tube. The speed of response of a photoconductor may be about 0.03 seconds while that of a diode is about $10^{-6}$ seconds.

SUMMARY OF THE INVENTION

A direct view imaging tube which incorporates a reversed biased diode array sensing structure associated with a velocity selection tube so that the advantages of the semi-conductor wafer p-n junction technology and radiation detecting capability can be combined with the contrast enhancement of the velocity selector tube. A preferred embodiment of the invention incorporates a velocity selection type image tube including a photoemissive mosaic surface within the interior of the tube and provided on an input window. Electrically conductive members extend through the input window with the inner end of the conductive member in electrical contact with a photoelectric island. The exterior ends of these conductive members or pins are in electrical contact with a reverse bias silicon diode. The diodes are formed by utilizing a silicon wafer of p-type conductivity, providing an n-type dopant on the outer surface of these conductive pins and then pressing the p-type silicon wafer against these conductive pins and by heat treatment forming a p-n junction within the silicon wafer. The silicon wafer provides the sensing portion of the device and also controls the emission from the photoemissive surface within the tube corresponding to the input radiation directed onto the silicon wafer.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
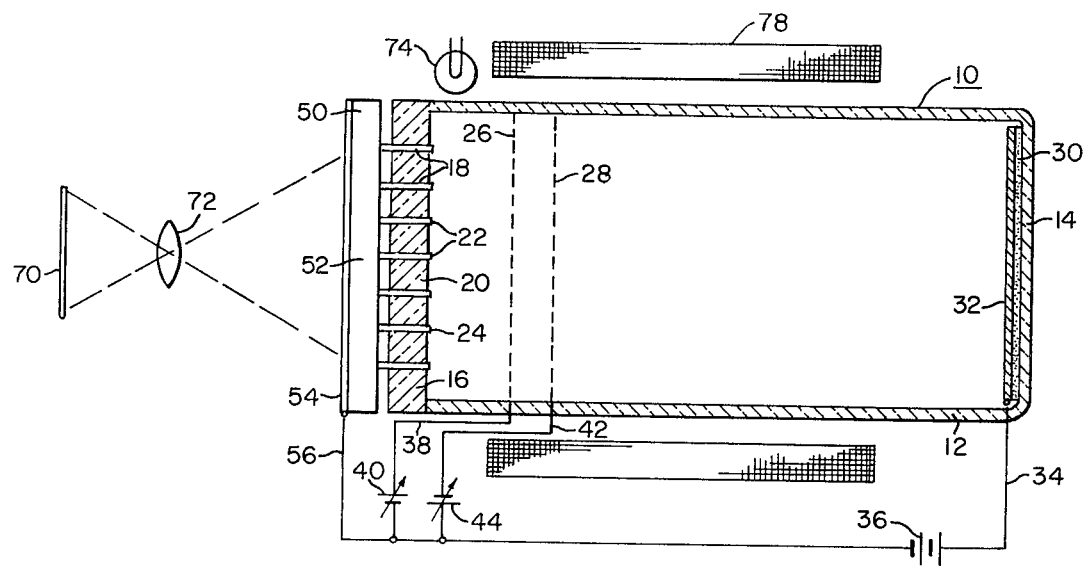
FIG. 1 is a schematic illustration of a direct view imaging tube in accordance with the teachings of this invention.
Figure 2:
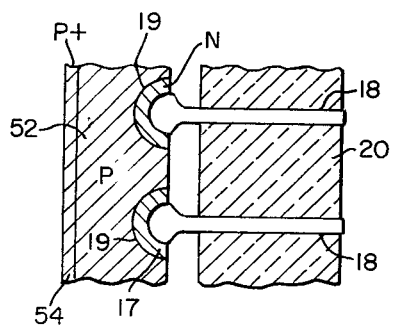
FIG. 2 is an enlarged sectional view of a part of the apparatus shown in FIG. 1.

FIG. 1 illustrates a direct view imaging device comprising an evacuated envelope 10. The envelope 10 consists of a tubular body portion 12, an output end wall 14 and an input end wall 16. The input end wall 16 comprises a plurality of electrically conductive members 18 which are embedded in an insulating matrix 20 and extend through the matrix 20. The diameter of the wires 18 may be about ($12 \times 10^{-4}$ cm) and the wires 18 may be spaced at a distance of about ($50 \times 10^{-4}$ cm) from each other. The wires 18 may be of a suitable material such as tungsten. The insulating matrix 20 may be of any suitable material such as glass. It is also possible to utilize a more conductive material for the matrix 20 and provide insulating sleeves around the wires 18. The input end wall 16 is vacuum tight throughout.

A photoemissive mosaic coating 22 is provided on the inner surface of the end plate 16 and is positioned as a mosaic pattern so as to provide a photoemissive element 24 in electrical contact with each of the wires 18 extending through the end wall 16. A suitable photoemissive material is cesium antimonide. Spaced by a small distance such as ¼ to 1 inch depending upon the electron optics, from the mosaic coating 22 is a first electrical conductive grid 26 and spaced by a similar distance from the grid 26 is a second electrical conductive grid 28. The grids 26 and 28 may have a mesh spacing of 500 to 750 spaces/inch and of a suitable material such as copper plus iron plating. An output screen 30 is provided on the output end wall 14 and may be of an electron bombardment sensitive material such as phosphor which emits light in response to electron excitation. An electrically conductive backing 32 of a material such as aluminum may be provided over the phosphor layer 30. The electrically conductive layer 32 is connected by means of a lead 34 to the positive terminal of a DC potential source 36. The grid 26 is connected by a suitable lead 38 to the positive terminal of a DC potential source 40 with the negative terminal of the source 40 connected to the negative terminal of the potential source 36. The grid 28 is connected by means of a lead 42 to the negative terminal of a DC potential source 44 with the positive terminal of the source 44 connected to the negative terminal of the potential source 36. The potential of the source 36 may be about 5 to 8 volts. The potential of the source 40 may be about 10 volts and the source 44 may be about 8 volts.

A sensing member 50 is provided external of the vacuum envelope 10 and in front of the input window 16. The sensing member 50 is comprised of a wafer 52 of a suitable semiconducting material such as silicon. The wafer 52 may have a thickness of $20 \times 10^{-4}$ cm to $100 \times 10^{-4}$ cm and of a material such as silicon with a resistance of about 10 ohm-centimeter. The outer surface of the wafer 52 may have a p+ region 54 for making an ohmic contact to the p-type silicon wafer, and reducing radiation reflection. A lead 56 connects the p+ region 54 to the negative terminal of the potential source 36. The inner surface of the wafer 52 is secured to the lead members 18 extending from the end wall 16 to provide an n+ region 17 about each contact. This structure may be fabricated by electroplating the extension of the leads 18 from the front of the end wall 16 with a material suitable for doping the p-type silicon to n-type. One suitable material is arsenic which may be electroplated onto the electrical conductive lead 18. The wafer 50 is then placed in physical contact with the electroplated leads 18 and then region 17 may be formed by passing current through the lead 18 or by heating the assembly. A p-n junction 19 is formed between each of the regions 17 and the wafer 52. The sensing member 50 may be attached to the end wall 16 either prior to assembling the end wall 16 to the envelope 10 or if desired the sensing member 50 could be secured thereto after the envelope 10 had been evacuated and processed.

In the operation of the device, input radiations from a scene 70 are directed through a suitable focussing system 72 onto the sensing member 50. An external light source 74 directs radiation of uniform intensity over the mosaic layer 22 which causes emission of photoelectrons resulting in a positive potential being applied to the n-type elements 17 with respect to the negative potential applied by the source 36 to the p-type region 52 of the target 50 thereby establishing a reverse bias across each of the p-n junctions 19. Without incident radiation on the sensing layer 50, electrons emitted by the photoemitting layer 22 will be accelerated through the accelerating grid 26, but due to the relatively high positive potential on the mosaic photoemissive surface 22 these electrons will not be able to overcome the negative retarding potential applied to the grid 28 and, therefore, no electrons will bombard the output screen 30. When radiation from the scene 72 is directed onto the sensing layer 50 electron-hole pairs are generated within the p-type region 52 of the sensing layer 50. The holes are drawn to the negative potential while the minority carriers, namely electrons, pass through the depletion region of the junction 19 and enter the n-type region 17. This resultant charge flow passes along the lead 18 to the photoemissive surface 22 and makes the potential more negative at the photoemissive surface 22. This in effect then adds energy to the photoelectron emitted by the photoemissive surface 22 and the photoelectrons are able to overcome the retarding potential of the grid 28 and are accelerated by the potential from the source 36. Electrons passing through the grid 28 are focussed by suitable focussing means such as a coil 78 onto the output screen 30. Thus an image is formed on the output screen 30 corresponding to the spatial distribution of the radiation image directed onto the sensing layer 50.

It is obvious that certain other applications are possible. A sensing layer may be utilized which is sensitive to electron input. Such a sensing layer would be provided within the envelope and a photoemissive input would convert the input radiation to electrons and then direct the electron directed onto the sensing layer sensitive to electron impingement. It is also possible to utilize a radiation conversion layer such as a phosphor which emits radiation of a different wavelength than those received to which the sensing layer 50 would be sensitive. It is also possible that the sensing layer 50 could be provided within the envelope and simply evaporate the photoemissive material directly onto the n-type region 17.

I claim as my invention:

1. An image device comprising an input sensing member comprised of a wafer of semiconductive material of a first type of conductivity having an input and an output surface, a plurality of regions of semiconductive material of a second type of conductivity of opposite type conductivity to said first type on the output surface of said wafer and extending into said wafer a discrete distance and forming a plurality of junctions, said input sensing member exhibiting the property of generation of electron-hole pairs in response to incident radiation directed onto said input surface, means for reverse biasing said junction comprising a photoemissive element and means for electrically connecting the photoemissive element with each of said regions and means for illuminating said photoemissive elements, an output screen associated with said photoemissive elements to generate a light image in response to the photoelectrons emitted from said photoemissive elements striking said output screen, a first grid positioned adjacent to said photo-emissive elements for accelerating the photo-electrons emitted from said photoemissive elements and a second grid positioned between said accelerating grid and said output screen for velocity selection of the photoelectrons emitted from said photoemissive elements and passing through said accelerator grid, said sensing member responsive to said input radiations to modify the potential of said photoemissive elements.

2. The device of claim 1 in which said means for electrically associating said photoemissive elements with said semiconductive region comprises an electrically conductive element.

3. The device of claim 1 in which said photoemissive element is provided on the inner surface of a faceplate member within an evacuated envelope, said sensing member is positioned exteriorly of said envelope and adjacent the outer surface of said faceplate and said means for electrically associating said photoemissive element with said semiconductive regions comprises a plurality of electrical conductive members extending through said faceplate.

4. The device of claim 1 in which said semiconductive material is silicon.

5. The device of claim 1 in which said semiconductive material is p-type silicon and said regions are n-type silicon.

* * * * *